US008610734B2

(12) United States Patent
Emerson et al.

(10) Patent No.: US 8,610,734 B2
(45) Date of Patent: *Dec. 17, 2013

(54) OPERATING SYSTEM INDEPENDENT METHOD AND APPARATUS FOR GRAPHICAL REMOTE ACCESS

(75) Inventors: Theodore F. Emerson, Houston, TX (US); Wesley Ellinger, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1889 days.

This patent is subject to a terminal disclaimer.

(21) Appl. No.: 10/611,403

(22) Filed: Jul. 1, 2003

(65) Prior Publication Data

US 2006/0164406 A1    Jul. 27, 2006

Related U.S. Application Data

(63) Continuation of application No. 09/438,253, filed on Nov. 12, 1999, now Pat. No. 6,664,969.

(51) Int. Cl.
*G06T 9/00*     (2006.01)

(52) U.S. Cl.
USPC ........................................................ 345/555

(58) Field of Classification Search
USPC .................................. 345/544, 562, 563, 555
See application file for complete search history.

(56) References Cited

U.S. PATENT DOCUMENTS

| 5,241,625 A * | 8/1993 | Epard et al. .................. 345/502 |
| 5,255,361 A * | 10/1993 | Callaway et al. ............. 345/522 |
| 5,473,348 A * | 12/1995 | Fujimoto ...................... 345/569 |
| 5,485,212 A * | 1/1996 | Frederick ................. 375/240.12 |
| 5,990,852 A * | 11/1999 | Szamrej ......................... 345/2.1 |
| 6,014,133 A * | 1/2000 | Yamakado et al. ........... 345/501 |
| 6,331,855 B1 * | 12/2001 | Schauser ...................... 345/502 |

OTHER PUBLICATIONS

Definition of "Run-length encoding" from www.dictionary.com.*

* cited by examiner

*Primary Examiner* — Hau Nguyen

(57) ABSTRACT

A method and apparatus for updating video graphics changes of a managed server to a remote console independent of an operating system. The screen (e.g. frame buffer) of the managed server is divided into a number of blocks. Each block is periodically monitored for changes by calculating a hash code and storing the code in a hash code table. When the hash code changes, the block is transmitted to the remote console. Color condensing may be performed on the color values of the block before the hash codes are calculated and before transmission. Compression is performed on each block and across blocks to reduce bandwidth requirements on transmission. Periodically, the configuration of a video graphics controller and a pointing device of the managed server are checked for changes, such as changes to resolution, color depth and mouse movement. If changes are found, the changes are transmitted to the remote console. The method and apparatus may be performed by a separate processor as part of a remote management board, a "virtual" processor by causing the processor of the managed server to enter a system management mode, or a combination of the two.

35 Claims, 15 Drawing Sheets

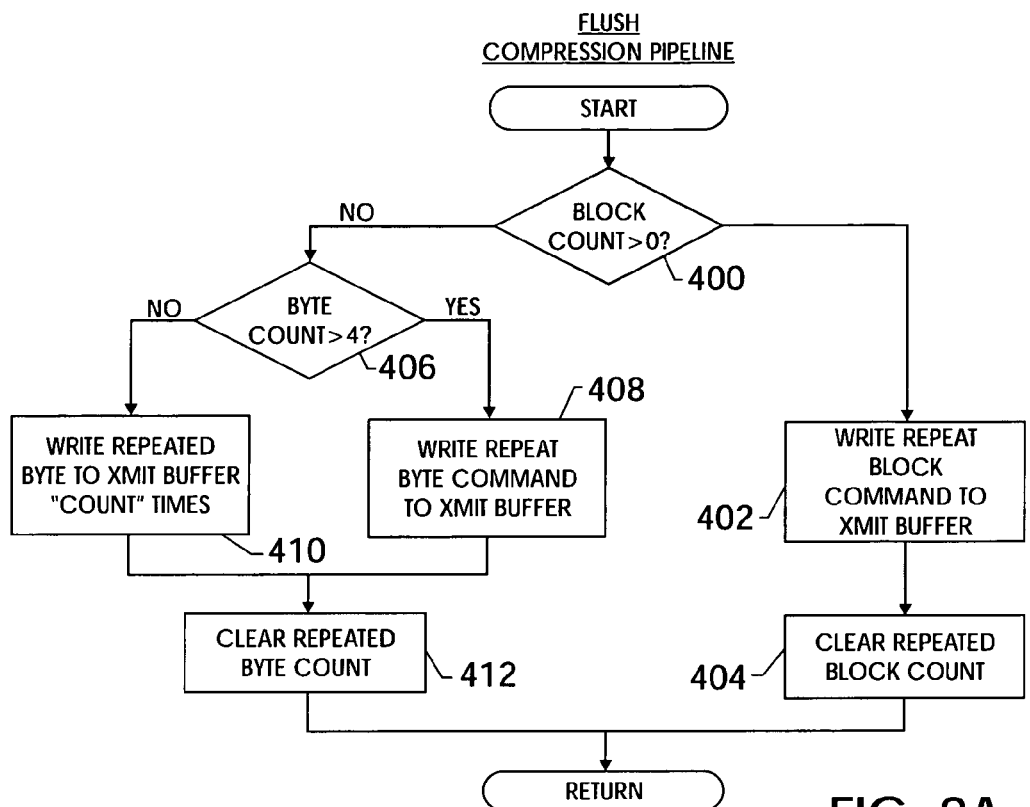
FIG. 8A
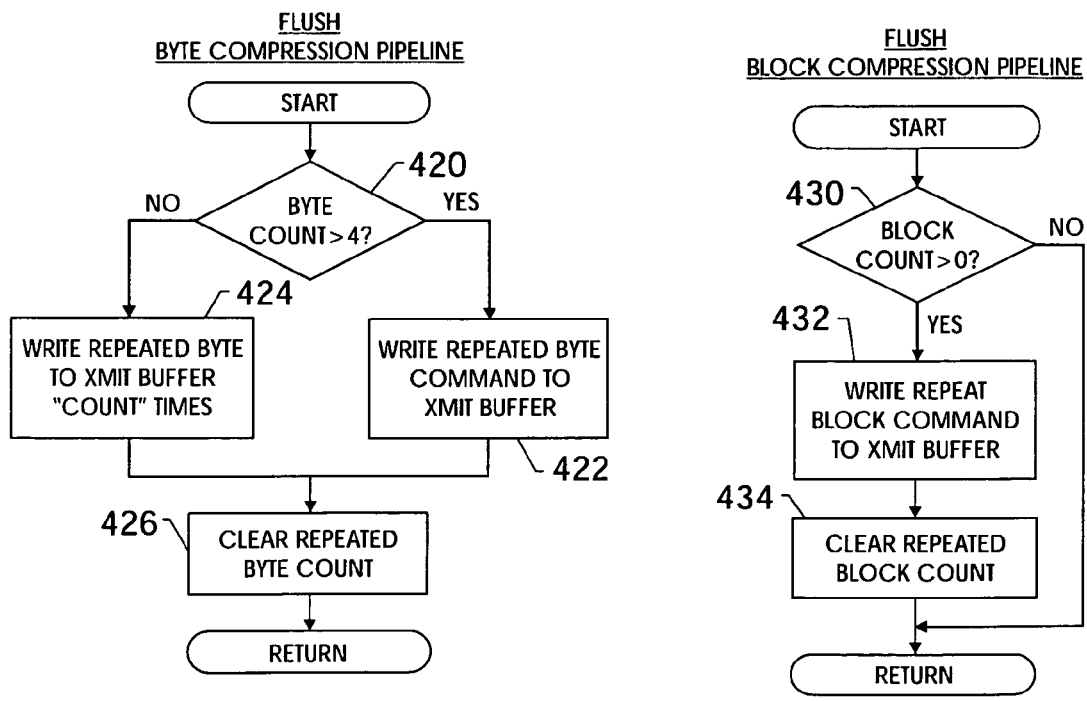
FIG. 8B
FIG. 8C

OPERATING SYSTEM INDEPENDENT METHOD AND APPARATUS FOR GRAPHICAL REMOTE ACCESS

CROSS REFERENCE TO RELATED APPLICATION(S)

This is a continuation of application Ser. No. 09/438,253 filed on Nov. 12, 1999, now U.S. Pat. No. 6,664,969 which is hereby incorporated by reference herein.

BACKGROUND OF THE INVENTION

1. Field of the Invention

The present invention relates generally to a method and apparatus for remotely accessing, interacting and monitoring a computer system independent of the operating system, and more particularly to remotely displaying graphics-mode display data of the accessed computer system.

2. Description of Related Art

Advances in computing technology have caused a shift away from centralized mainframe computing to distributed computing using multiple personal computers (PCs) connected to a network. The network typically includes one or more server class personal computers to handle file, print and application services, which are common to all the connected PCs. Therefore, the server becomes an important resource which the entire network depends upon.

Oftentimes, businesses may require more than one server. Networks may demand isolation for security reasons. Networks may be logically subdivided for performance or practical reasons. In particular, networks may be in different geographic locations. However, oftentimes the maintenance and management of the servers falls onto a single group or person, called a network administrator. In these cases where the managed server is in an inconvenient location, it is desirable for the network administrator to be able to monitor the health of the managed server without traveling to its location.

In the past, the local network administrator operating from a remote management computer could telephonically connect into the operating system of a managed server to monitor its health using a conventional communications package such as PC Anywhere or ProComm. This method required a third communications computer to be attached to the network. Typically, a connection would first be established from the remote management computer to the communications computer attached to the network of the server. If the server was operating, the network administrator would be prompted for a login password to access network resources, including the server. If the server was down, only the communications computer could be accessed (providing that PC had its own modem). After the administrator logged into the network, a server console utility, such as RCONSOLE, could be executed to gain access to the server. Because many times the server would be down, this method had limited usefulness. Additionally, only limited information was provided, since the server would have to be operating before the server console utility would operate.

Network administrators also have used products such as Compaq's Insight Manager. This software product is loaded by the operating system to allow users to connect to the operating system through a dedicated modem using (remote access service) RAS/PPP (point to point) protocols. This method also allows insight into the operating system, but only after the server is operating.

To help in this regard, an accessory known as Compaq Server Manager R was developed. This accessory was essentially a personal computer system on an add-in board adapted to interact with the host server. Server manager R included a processor, memory, modem and software to operate independently of the server to which it was installed. To monitor the server from a remote location, the network administrator would dial into the server manager R board and establish a communications link. If a connection was established, the processor of server manager R would periodically acquire access to an expansion bus of the server to read the contents of the server video memory. The processor would then send the contents *[text or graphics]* to the local computer via the communications link. A separate power supply was provided to the server manager R board so that it would operate even while the server was booting or powered down. Although the functionality provided by the server manager R board was desired, because it was essentially a second computer, the high cost of this solution limited its success.

Later, a more integrated approach was taken with a device known as the integrated remote console (IRC) device. This device would connect to a conventional peripheral component interconnect (PCI) bus to monitor video activity. As PCI transactions were passed to a video controller also attached to the PCI bus, the IRC device would snoop the video transactions for the purpose of encoding the screen activity and sending the encoded data to a remote computer. IRC worked best with text-mode operating systems. If the server was running a graphical operating system, such as Microsoft Windows, the IRC device would cease to transmit information when the graphics mode was entered upon boot-up. Thus, although the IRC device was very useful for text-mode operating systems and to monitor graphical operating systems prior to entrance into graphics mode, a more complete solution was desired.

SUMMARY OF THE INVENTION

In one embodiment of the present invention, a managed server includes a video graphics controller having a frame buffer. The frame buffer may be periodically read to determine if the contents of the frame buffer has changed. Changes are transmitted to a remote console in communication with the managed server.

The frame buffer may be divided into a number of blocks with each block having a unique number based on its contents. The unique numbers may be stored in a buffer. As the blocks are periodically read, new unique values are calculated and compared to the previously calculated unique values to determine if the blocks have changed. The changed blocks are transmitted to the remote console via a communications link.

Each pixel contained in the frame buffer may be condensed into a smaller 6-bit value before calculating the unique value and transmitting to the remote console. Furthermore, the blocks may be compressed by using a run length-encoding algorithm. If two more blocks are similar, the first block is transmitted followed by a command indicating the number of times to repeat the block.

Instead of reading each block of the frame buffer, a fraction of the frame buffer may be read, such as every fourth block. Each pass may read a different fraction of the frame buffer until the entire frame buffer has been read. If changes are detected during a pass, the blocks surrounding the changed block may be "marked" for accelerated reading (i.e. read immediately or on the next pass). The "marks" are cleared once the blocks have been checked.

The blocks of the frame buffer comprise rows and columns. Periodically, such as at the end of each row, the video graphics controller is checked for configuration changes. Possible changes include changes to screen resolution, color depth and color mode. If changes are detected, commands are developed to communicate the changes to the remote console. Changes for a pointing device, including position, shape and size are handled similarly.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIGS. 8A-C are flow diagrams illustrating flushing the compression buffer;

DESCRIPTION OF ILLUSTRATIVE EMBODIMENTS

The following patents or patent applications are hereby incorporated by reference:

U.S. Pat. No. 5,898,861, entitled "Transparent Keyboard Hot Plug" by Theodore F. Emerson, Jeoff M. Krontz and Dayang Dai;

U.S. Pat. No. 5,790,895, entitled "Modem Sharing" by Theodore F. Emerson and Jeoff M. Krontz; and U.S. patent application Ser. No. 08/733,254, entitled "Video Eavesdropping and Reverse Assembly to Transmit Video Action to a Remote Console" by Theodore F. Emerson, Peter J. Michaels and Jeoff M. Krontz, filed Oct. 18, 1996.

Figure 1:
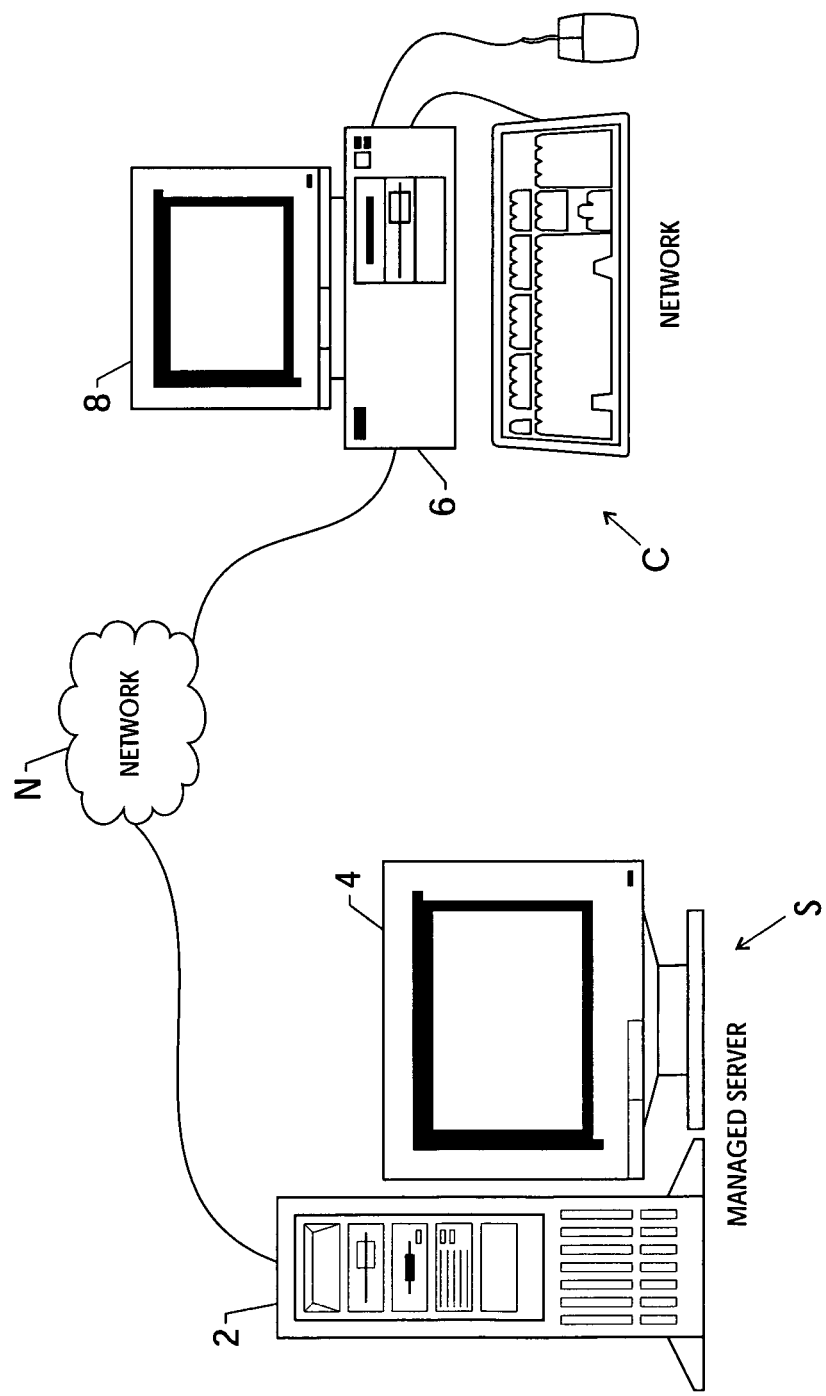
FIG. 1 is a connection diagram of a managed server and a remote management console according to a preferred embodiment.

Referring first to FIG. 1, there is illustrated a managed server S connected to a remote console ("C") by a network N. The managed server S includes a central processing unit ("CPU") 2 housing processing, memory, communications, interface, and other circuitry as described more fully below, and may be connected to a monitor 4. The remote console C also includes a CPU 6 and a monitor 8. The managed server S includes special circuitry and software for capturing, analyzing, compressing and transmitting video activity to the remote console C independent of an operating system ("OS"). The special circuitry and software operate without regard to the existence or type of OS present on the managed server S. Therefore, the present invention is useful for accessing, interacting and monitoring the managed server S from the remote console C even before its OS has been loaded. More specifically, the video displayed on monitor 4 is capable of being viewed on monitor 8 independent of the OS.

The network N can be any sort of network capable of transmitting data between two devices. Without limitation, some examples of networks include: a local area network, a wide area network, a hardwired point-to-point connection, a point-to-point connection over a telecommunications line, a wireless connection, and an internet connection.

Although the managed server S shown is preferably of an International Business Machines. (IBM) PC variety, the principles of the present invention are equally applicable to other computer platforms or architectures, such as those manufactured by IBM, Apple, Sun and Hewlett Packard. Additionally, the managed server S could be one architecture and the remote console C could be another. For example, the managed server S could be a x86 architecture machine computer running Microsoft Windows NT OS and the remote console C could be a Sun workstation running Solaris OS.

In the operation of the present invention, video data is captured, analyzed, compressed and transmitted to the remote console C by special circuitry and software in the managed server S. The remote console C includes special software for receiving and interpreting the transmitted data in order to reproduce on its own monitor 8 the video data displayed on the managed server monitor 4. The transmitted video data is encoded with special commands to permit the remote console C to interpret the data stream.

Figure 2:
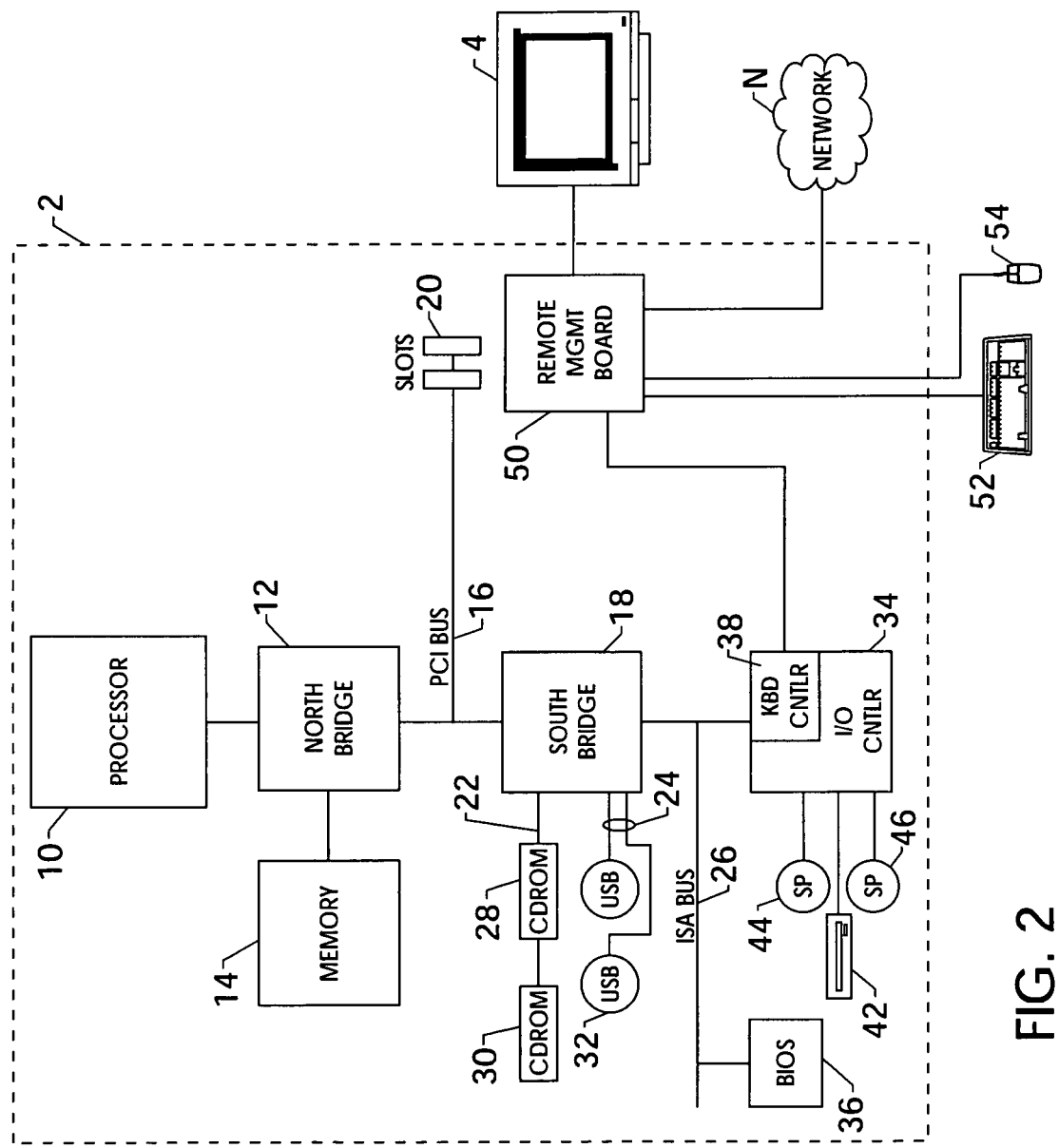
FIG. 2 is a block diagram of the managed server according to the preferred embodiment.

Now referring to FIG. 2, there is illustrated a block diagram of the managed server S according to the preferred embodiment. To provide sufficient processing power, the managed server S includes one or more processors 10, such as a Pentium II Xeon processor manufactured by Intel Corporation. Each processor 10 may include a special non-maskable interrupt, called the system management interrupt ("SMI"), which causes the processor to operate in a special system management mode ("SMM") independent of the operating system. This functionality is fully explained in literature available from Intel.

The processor 10 is coupled to a north bridge 12, such as an Intel 82451NX Memory and I/O Bridge Controller (MIOC). The north bridge includes a memory controller for accessing a main memory 14 (e.g. dynamic random access memory ("DRAM")), and a peripheral component interconnect ("PCI") controller for interacting with a PCI bus 16. Thus, the north bridge 12 provides the data port and buffering for data transferred between the processor 10, memory 14, and PCI bus 16.

In the managed server S, the PCI bus 16 couples the north bridge 12 to a south bridge 18 and one or more PCI slots 20 for receiving expansion cards (not shown). The south bridge 18 is an integrated multifunctional component, such as the Intel: 82371 (a.k.a. PIX4), that includes a number of functions, such as, an enhanced direct memory access ("DMA") controller; interrupt controller; timer; integrated drive electronics ("IDE") controller for providing an IDE bus 22; a universal serial bus ("USB") host controller for providing a universal serial bus 24; an industry standard architecture ("ISA") bus controller for providing an ISA bus 26 and ACPI compliant power management logic. The IDE bus 22 supports up to four IDE devices, such as a hard disk drive 28 and a compact disk read only memory ("CD-ROM") 30. The universal serial bus 24 is connected to a pair of USB connectors 32 for communicating with USB devices (not shown).

The ISA bus 26 couples the south bridge 18 to a multifunction input/output (I/O) controller 34 and a basic input/output system (BIOS) ROM 36. The multifunction I/O controller 34, such as a Standard Microsystems Corporation FDC37C68x, typically includes a number of functions, such as a floppy disk drive controller for connecting to a floppy disk drive 42; a keyboard controller 38 for connecting to a keyboard and a pointing device; a serial communications controller for providing at least one serial port 44; and a parallel port interface for providing at least one parallel port 46. Alternative multifunction input/output (I/O) controllers are manufactured by National Semiconductor and WinBond.

Further attached to the PCI bus 16 via one of the PCI slots 20 is a remote management board 50. The remote management board 50 connects to the keyboard controller 38, the network N, a keyboard 52 and a mouse 54 to provide functionality for accessing, interacting and monitoring the managed server S from the remote console C as will be more fully described below.

The functions described above may alternatively be implemented in separate integrated circuits or combined differently than described above without departing from the concept of the present invention.

Figure 3:
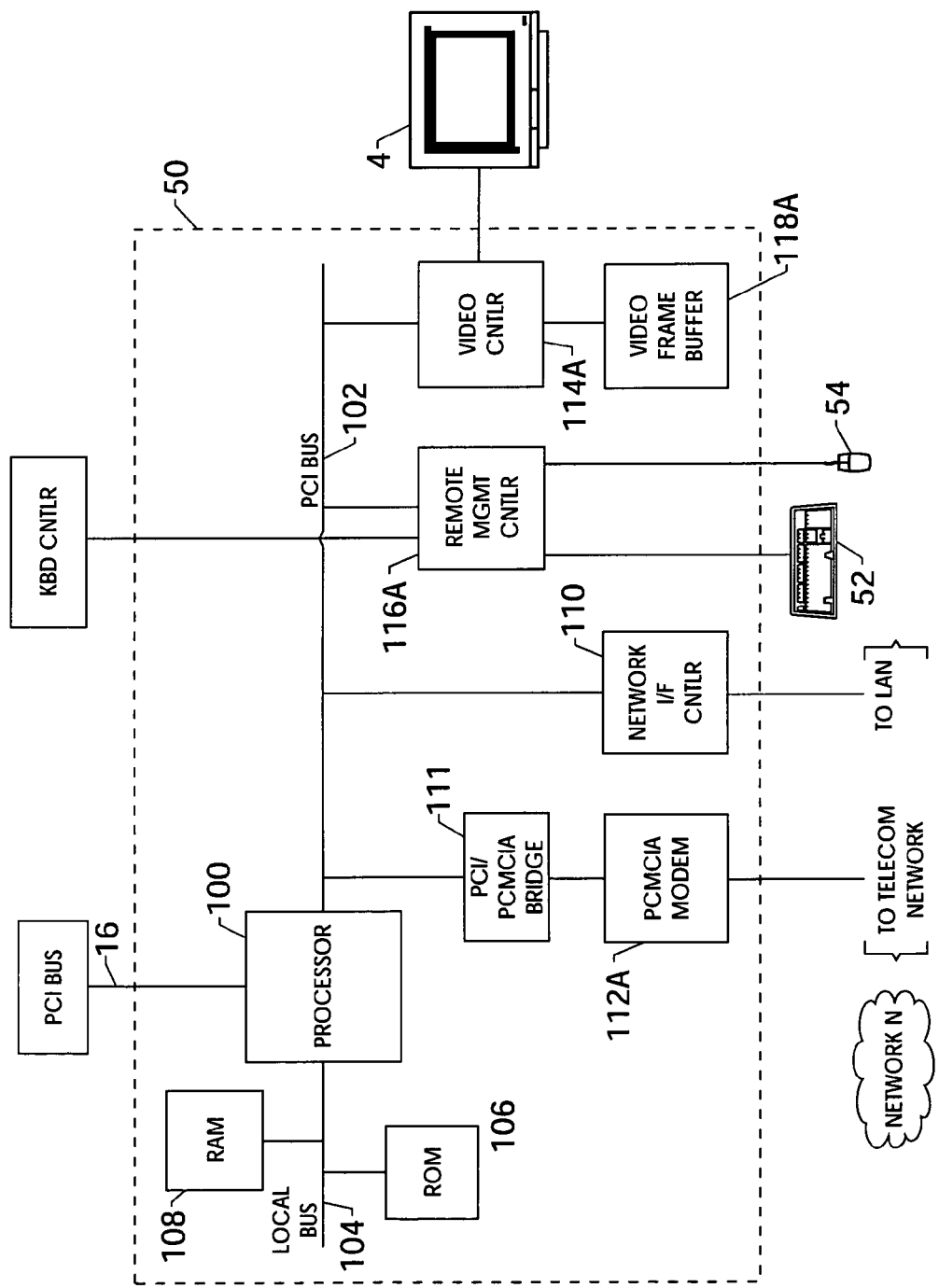
FIG. 3 is a block diagram of the remote management board of FIG. 2 according to the preferred embodiment.

Turning now to FIG. 3, there is illustrated a block diagram of the remote management board 50. Coupled to the PCI bus 16 is a processor 100, such as an Intel i960RP. The Processor 100 includes a PCI-to-PCI bridge unit for bridging PCI bus 16 (hereinafter primary PCI bus 16) to a secondary PCI bus 102. Alternatively, a separate processor and bridge could be used. The processor 100 also includes a secondary PCI bus arbitration unit, an integrated memory controller and three direct memory access ("DMA") channels. The processor 100 operates independently of the processor 10, and therefore, includes a memory controller for accessing memory (e.g. read only memory 106 and random access memory 108) over a local bus 104 in order to boot its own operating system, such as Wind River System's IxWorks RTOS. One or more communications devices are also connected to the local bus 104, such as a network interface controller ("NIC") 110 and a modem 112. Other communications devices can be used as required by the network type.

The secondary PCI bus 102 is seen by the processor 10 as a logical extension of the primary PCI bus 16. Further attached to the secondary PCI bus 102 is a video graphics controller 114a and a remote management controller 116a. The video graphics controller 114a is an integrated video graphics controller, such as an ATI technologies Rage IIC or XL, that supports a wide variety of memory configurations, color depths and resolutions. Connected to the video graphics controller 114a is a frame buffer 118a (e.g. synchronous DRAM) for storing video graphics images written by the processor 10 for display on the monitor 4.

The remote management controller 116a includes circuitry for snooping configuration transactions between the processor 10 and the video graphics controller 114a to determine configuration and mode information, such as whether the video graphics controller is in text or graphics mode. The remote management controller 116a also includes circuitry to route keystrokes to the keyboard controller 38 from either the local keyboard 52 or from the remote console C (via the modem 112a or NIC 110). This keyboard functionality is more fully explained in U.S. Pat. No. 5,898,861, entitled "Transparent Keyboard Hot Plug."

In the operation of the remote management board 50, the processor 100 may periodically read the video graphics data from the frame buffer 114a in order to determine whether the data has changed. If the data has changed, the processor 100 will compress the video graphics data and transmit the data to the remote console C via one of the communications devices (i.e. modem 112a or NIC 110). The remote console C will decompress and decode the data stream and display it at the remote console C for viewing by a user.

Figure 4:
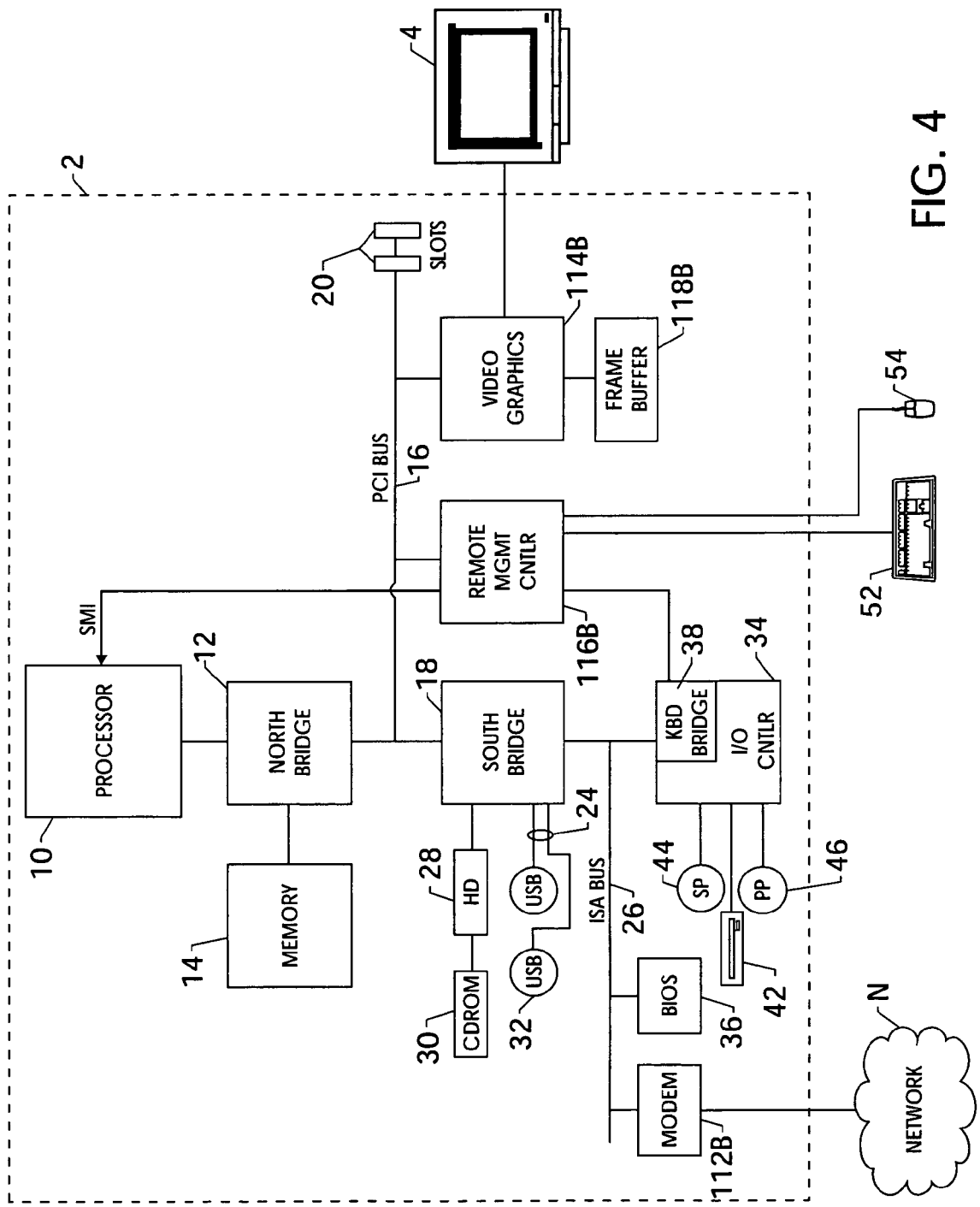
FIG. 4 is a block diagram of the managed server according to an alternative embodiment.

Now referring to FIG. 4, there is illustrated a first alternative embodiment of managed server S offering a more integrated and less expensive solution than that described in FIGS. 2 and 3. Since many of the components are the same as in FIG. 2, only the differences will be discussed.

Attached to the PCI bus 16 is the remote management controller 116b and the video graphics controller 114b. The remote management controller 116b is connected to the keyboard controller 38 and the keyboard 52 for routing keystrokes based on whether the remote console C is operational. Modem 112b is connected to the ISA bus 26 in a conventional manner for use by standard communications programs. However, in this embodiment, the modem 112b may be claimed by the remote management controller for exclusive use with the remote console C. Further details on modem sharing can be found in U.S. Pat. No. 5,790,895, entitled "Modem Sharing." Although only a modem is shown, it is understood that any type of communications device could be used.

In this alternative embodiment, an independent processor, such as the processor 100 is not provided. Instead, the system management mode of the processor 10 is utilized to provide a "virtual" processor. The remote management controller 116b is configured to periodically interrupt the processor 10 with a system management interrupt, thereby causing processor 10 to enter system management mode and function as a "virtual" processor.

When functioning as a "virtual" processor, the processor 10 will read the frame buffer 118b in order to determine whether the video graphics data has changed. If the data has changed, the processor 10 will compress the video graphics data and transmit the data to the remote console C via a communications device (i.e. modem 112b).

Thus in this first alternative embodiment, processor overhead is sacrificed for a better-integrated solution. A second alternative embodiment involves using the "virtual" processor 10 for special functions and the processor 100 for the remaining processing. For example, if a communications device was not provided on the remote management board 50 but instead was attached to the ISA bus 26 or PCI bus 16, the system management mode of processor 10 can be used to handle communications between the managed server S and the remote console C. As another variation, the processor 10 can be configured to trap on writes to the frame buffer 118b to assist in determining when video graphics data has changed. As a further variation, if the video graphic controller were located on an accelerated graphics port ("AGP"), the processor 10 could be configured to trap on all writes to the frame buffer 118b to assist in determining when the video graphics data has changed.

For purposes of simplicity, the remaining description will correspond with the preferred embodiment, but it is understood that the processes can be adapted according to the first and second alternative embodiments.

Reading and Analyzing

Figure 5:
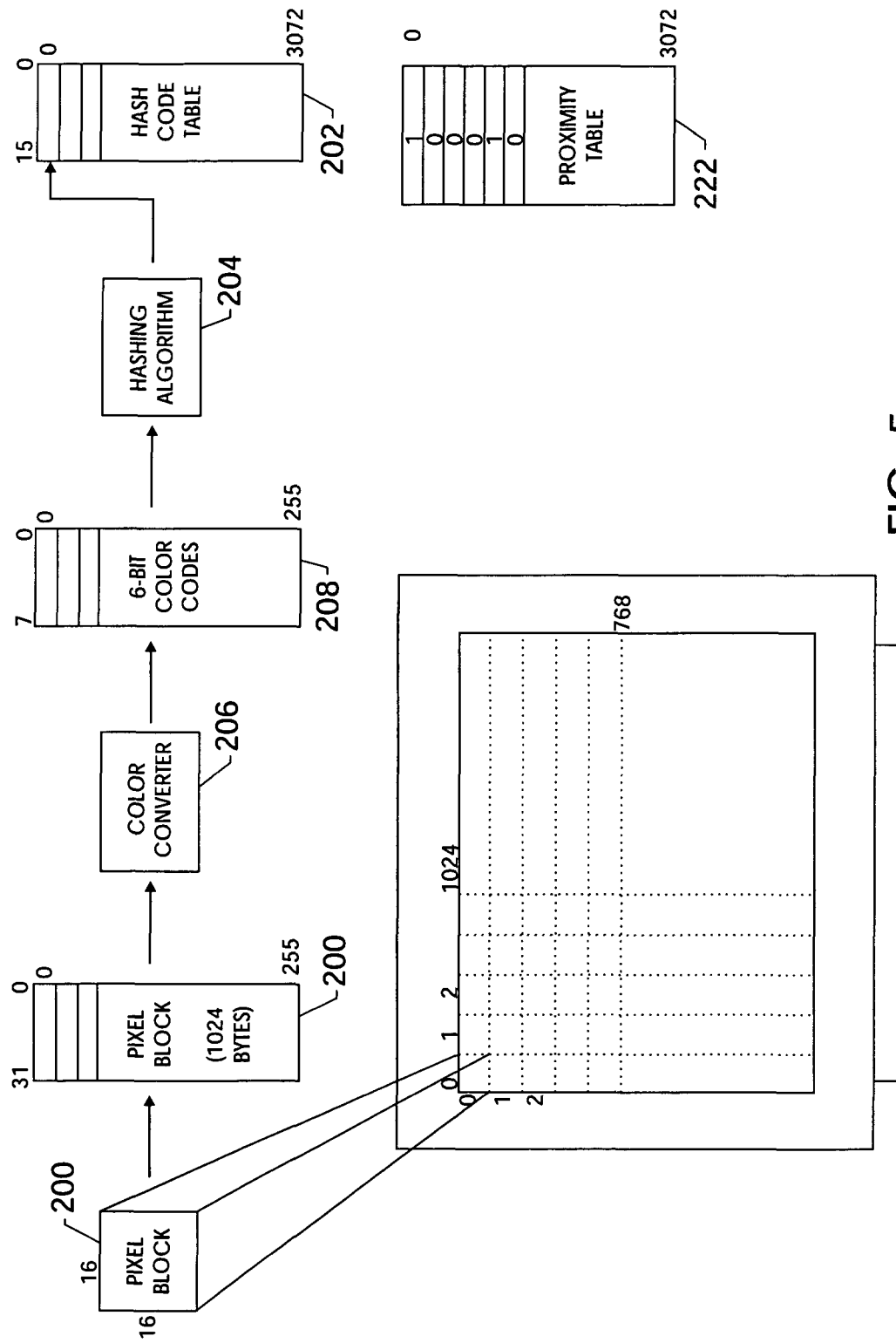
FIG. 5 is a block diagram of the reading, color converting and hashing processes according to the preferred embodiment.

Now turning to FIG. 5, there is illustrated a flow diagram of the reading and analyzing processes according to the preferred embodiment of the present invention. Analyzing video graphics data for change starts with dividing the video graphics data of the frame buffer 118a/b into manageable blocks 200, such as 16×16 pixel blocks. For example, a 1024×768 display resolution would result in 48 rows and 64 columns for a total of 3072 blocks. Initially, each of the 3072 blocks is transmitted to the remote console C. Thereafter, a given block is only transmitted if it has changed as compared to a previously transmitted block.

Generally, changes in a given block's data are determined by comparing the block's previously transmitted data to the block's current data. This determination is simplified in the preferred embodiment by comparing hash codes calculated for each block 200. A hash code is a unique number mathematically calculated by performing a hashing algorithm 204, such as a 16-bit cyclic redundancy check or other algorithm resulting in a unique number. The first time the block 200 is hashed the unique number is stored in a hash code table 202 formed in memory 108. Thereafter, each time the block is read and hashed another unique number is calculated. If the newly calculated number matches the number stored in the hash table 202, the block 200 has not changed. If the numbers don't match, the block 200 has changed and is transmitted to the remote console C.

The process is further simplified and data transmission is more efficient if the pixel values are condensed into a smaller number, such as 6-bits, before performing the hashing algorithm. For this purpose a color converting algorithm 206 is provided, as described in Table I for developing a 6-bit, zero-padded, color pixel block 208 in memory 108. For color values 8-bits or less a color lookup table is used and for pixel values greater than 8-bits a mathematical calculation is applied to produce a 6-bit value. For example, a 24-bit color value of 0xd5aad5h will result in a 6-bit value of 0x00101010b. The color lookup tables are based on the color lookup tables provided with the video graphics controller 114a/b.

Bit shifting the full color values may be used an alternative to the above color condensing method. Although using the above-described color condensing technique is preferred, it is understood that full color values could be used with proper transmission bandwidth without changing the principles of the present invention.

It is noted that if the first alternate embodiment is employed, the 6-bit color code table 208 and the hash code table 202 would be formed in system management memory of the "virtual" processor 10.

TABLE I

| INPUT | COLOR CONVERSION | OUTPUT |
|---|---|---|
| 1 bit color | color lookup table | 6-bit RGB color value |
| 2 bit color | | |
| 4-bit color | | |
| 8-bit color | | |
| 15-bit color | R*3/31, G*3/31, B*3/31 | 6-bit RGB color value |
| 16-bit color | R*3/31, G*3/63, B*3/31 | 6-bit RGB color value |
| 24-bit color | R*3/255, G*3/255, B*3/255 | 6-bit RGB color value |

Compressing and Transmitting

Figure 6:
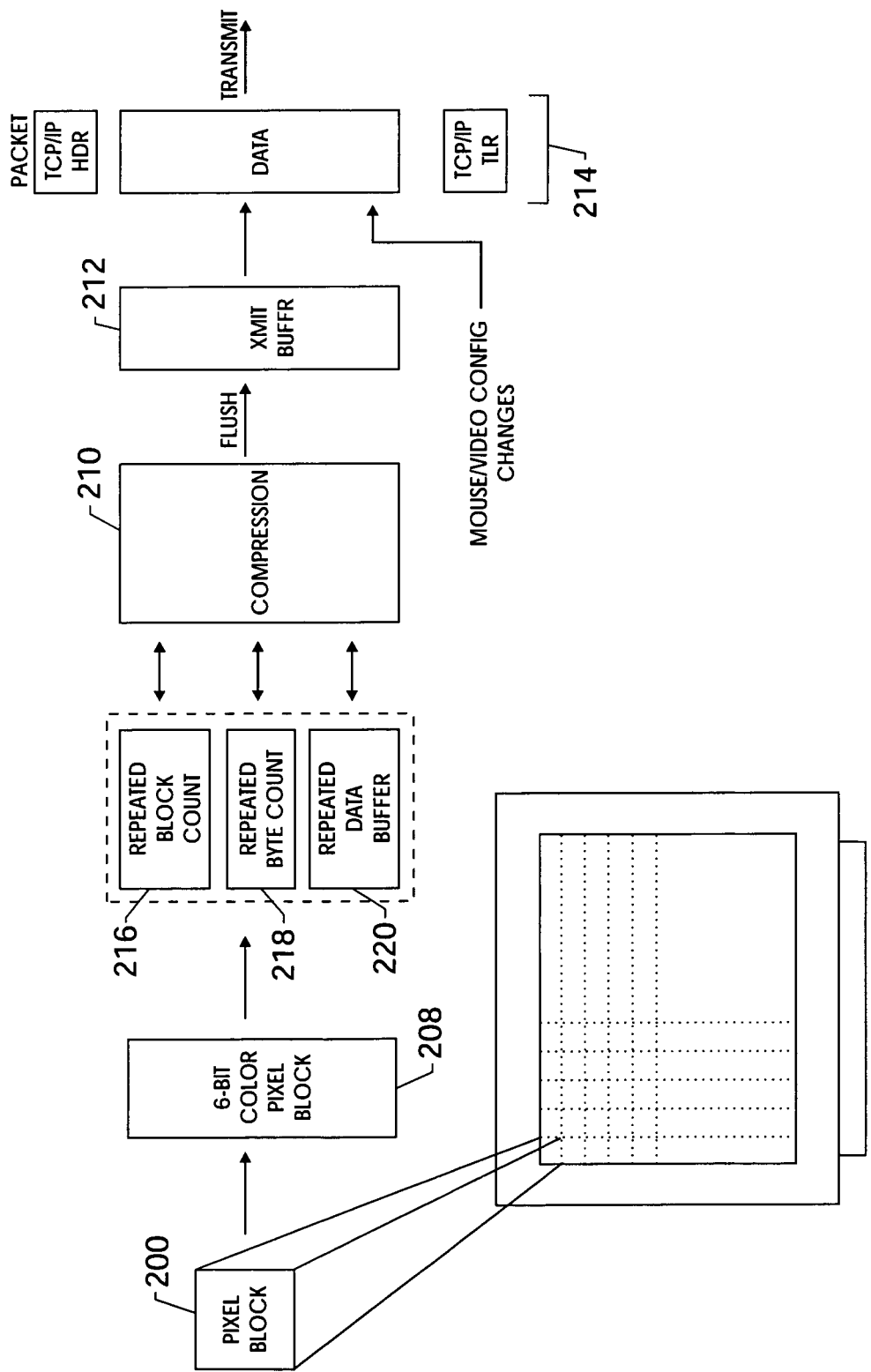
FIG. 6 is a block diagram of the compressing and transmitting processes according to the preferred embodiment.

Referring now to FIG. 6, there is illustrated a flow diagram of the compression and transmission processes according to the preferred embodiment of the present invention. A pixel block 200 is first converted to a 6-bit color pixel block 208, as noted above. Then the 6-bit color pixel block 208 may be compressed by a compression function 210 and temporarily stored in a transmit buffer 212. At least at the end of each row, a transmit packet 214 is developed having a conventional header and footer as required by the particular network transport scheme. For example, a transmission control protocol/internet protocol ("TCP/IP") header and footer may be appended to the data for transmission over a local or wide area network to the remote console C. In the development of the transmit packet 214, the video graphics controller is checked for configuration changes and the mouse is checked for positioning changes. Any changes are also appended to the transmission packet 214. Video graphics changes may include: changes in resolution, mode, and color depth. Mouse changes may include: positioning, and cursor shape and size. For example, if the resolution of the video graphics controller was changed, the change would be appended to the transmission packet 214 and the change would take effect at the remote console C beginning with the next row.

Compressing the data is accomplished using run length encoding (RLE) techniques. The image compression algorithm 210 simply looks for long runs of the same pixel value and encodes it into a single copy of the value and a number representing the number of times that value repeats. Since each pixel block 200 is represented by a unique number (hash code) the same encoding can be used to look for long runs of the same pixel block 200. A repeated block count 216 tracks the number of times a block is repeated. A repeated byte count 218 tracks the number of times a byte is repeated either within a block or across blocks. A repeated data buffer 220 holds the repeated byte as it is compared to subsequent bytes.

Other graphics or multimedia compression techniques could be used instead of the RLE compression function 210, such as motion picture expert group (MPEG) encoding, joint photographic experts group (JPEG) encoding, and graphics interchange format (GIF) encoding. Additionally, these alternative compression techniques may operate better on full-color values instead of the 6-bit condensed color values created by the color converter 206.

Data Transmission Scheme

To access, interact and monitor the managed server S, the remote console C initiates a telnet session with the remote management board 50. If the managed server S is operating in a text display mode, the remote management board 50 will send a text data stream using standard telnet formatted commands to the remote console C, as described in U.S. patent application Ser. No. 08/733,254, entitled "Video Eavesdropping and Reverse Assembly to Transmit Video Action to a Remote Console." If the managed server S is operating in a graphics display mode, the remote management board 50 will encode the graphics data using one of two types of special commands: an american national standards institute ("ANSI") escape sequence formated command or a special telnet formated command.

The special commands are interpreted by software running on the remote console C. The remote console C communicates its ability to interpret the special commands before the remote management board 50 will send graphics data. If the remote console is a conventional telnet client, the graphics data will not be sent, but the remote management board 50 will still send text mode data. Thus, even if the special client software is not available at a remote console, any telnet session is usable for text mode exchanges.

Software running on the remote console is configured to interpret the special commands and escape codes as described below. A command and data typically follow the telnet escape code to complete a data stream. The special telnet commands are defined below in Table II.

TABLE II

| COMMAND | USAGE | DESCRIPTION |
| --- | --- | --- |
| Move | 0xff 0xe5 X Y | Moves the pen to a new x-y coordinate. X and Y are 8-bit values representing the row and column to place the pen. |
| Repeat8 | B 0xff 0xe6 R8 | Repeats a byte of data B up to 255 times. B and R8 are 8-bit values. R8 specifies the number of repeats. |
| Repeat16 | B 0xff 0xe7 R16 | Repeats a byte of data B up to 65535 times. B is an 8-bit value and R16 is a 16-bit value. R16 specifies the number of repeats. |
| RepeatBlk8 | 0xff 0xe8 B8 | Repeats the previous block up to 255 times. B8 is an 8-bit number specifying the number of repeats. |
| RepeatBlk16 | 0xff 0xe9 B16 | Repeats the previous block up to 65535 times. B16 is an 16-bit number specifying the number of repeats. |

Special ANSI escape codes are sent only if the client used by the remote console C is ANSI compliant. The special ANSI escape codes are listed in Table III.

TABLE III

| COMMAND | USAGE | DESCRIPTION |
| --- | --- | --- |
| Graphics mode | esc] W ; H ; B g | Enables graphics mode at the remote console. W is the screen width encoded in ASCII. For example, 640-pixel width would be 545248h. H is the screen height encoded in ASCII. B is a ASCII character specifying the number of bits per pixel color (i.e. 2 or 6). Lowercase g is the command. |
| Text mode | esc] G | Enables text mode. Uppercase g is the command. |
| Pointer Position | esc] X ; Y h | Provides an absolute address of the mouse pointer relative to the top left corner of the screen. X is an ASCII encoded set of numbers representing the number of pixel positions to the right. Y is an ASCII encoded set of numbers representing the number of pixel positions down from the top. Lowercase h is the command. |
| Pointer Shape | esc] M C1 C2 D | Specifies the shape of the pointer. Uppercase m is the command. C1 and C2 are 6-bit, binary, 0-padded numbers representing a color value. D is a 1024 byte data stream representing a 64 × 64 pixel pointer image. Each 2-bit pixel value indicates one of four ways the pixel should be developed: using C1, using C1, XOR with screen or transparent. |

Operational Description

Figure 7A:
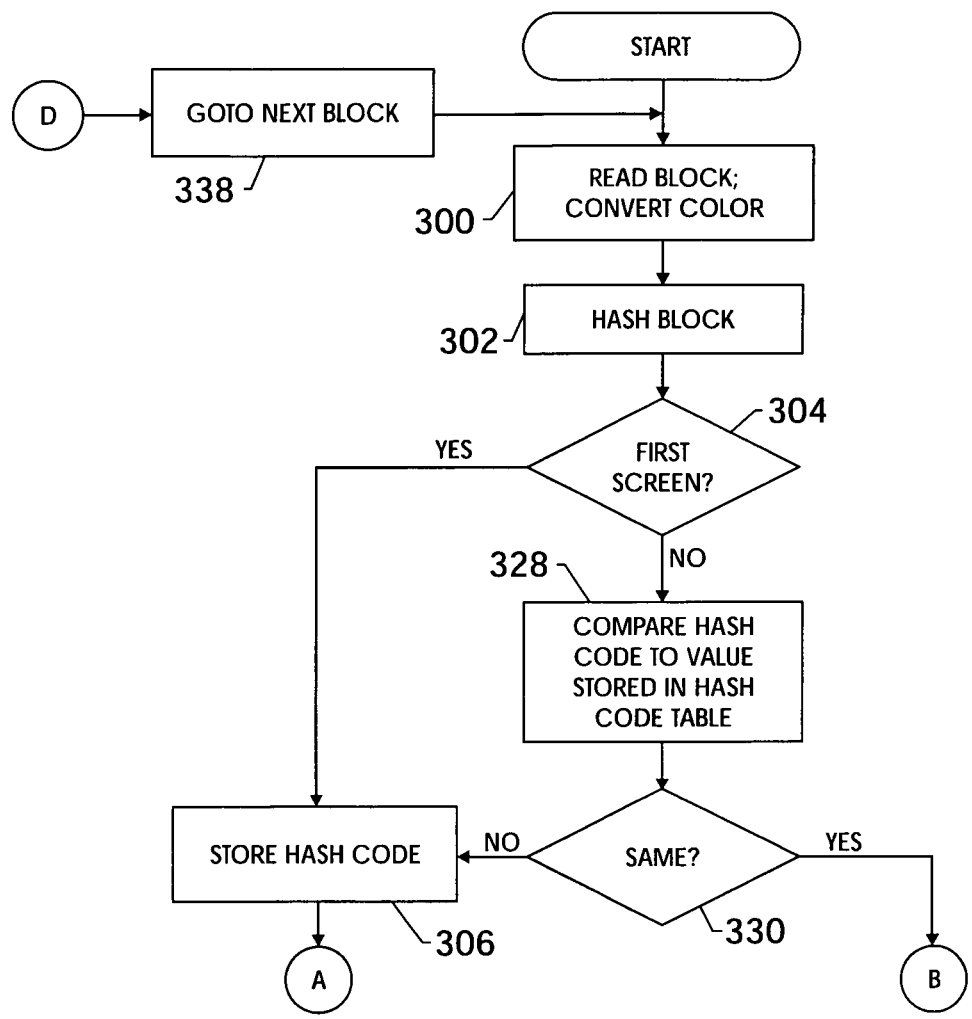
FIGS. 7A-C are flow diagrams illustrating the processes of FIGS. 5 and 6.
Figure 7B:
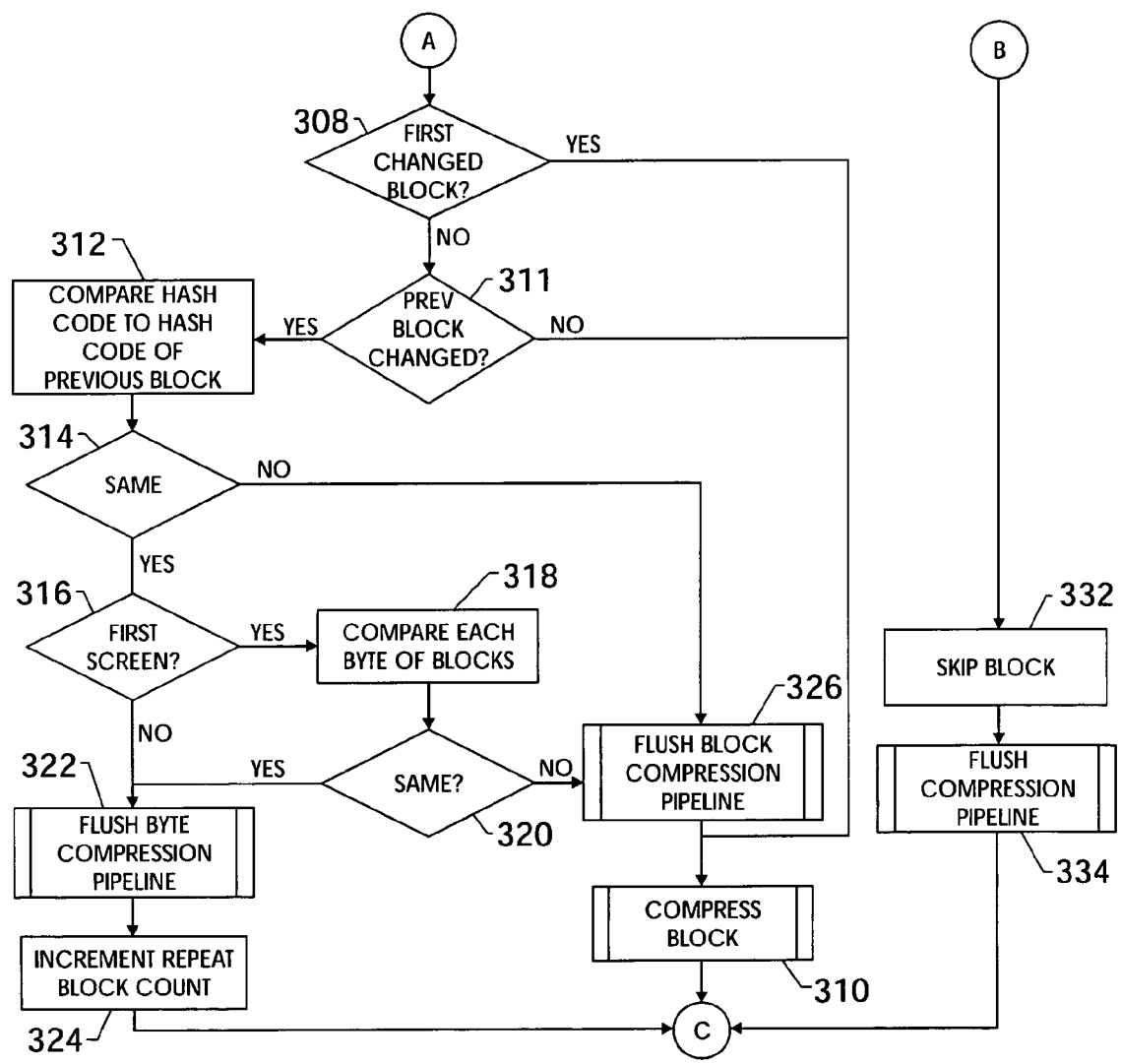
Figure 7C:
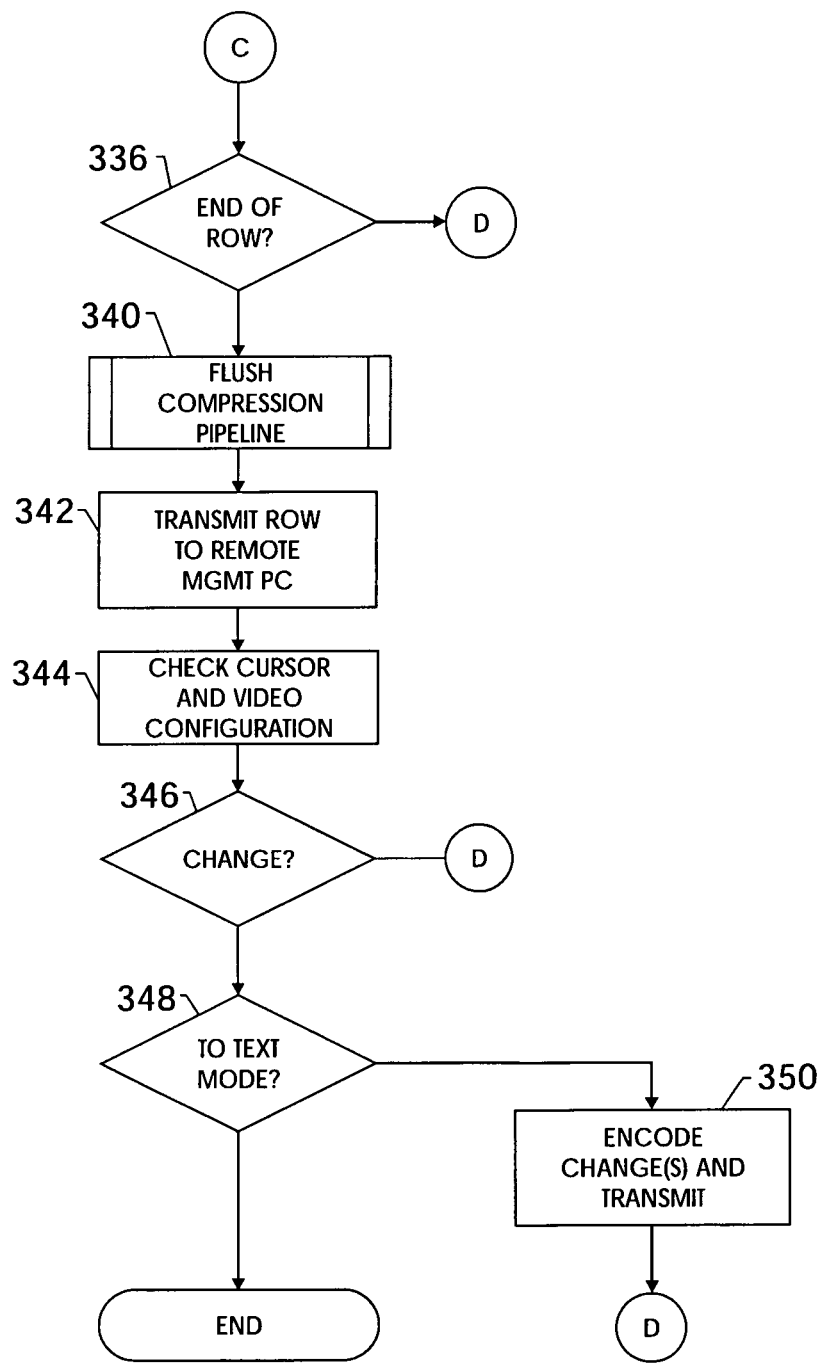

Turning now to FIGS. 7A-C, there is illustrated a flow chart of the methods related to reading, analyzing, compressing and transmitting video graphics data to the remote console C. According to the preferred embodiment, most of these steps are performed by the processor 100, but alternative embodiments may use the processor 10, as noted above.

Configuration cycles to the registers of the video graphics controller 114a are captured by the remote management controller 116a. Hence, the configuration of the video graphics controller, including resolution, color depth and color mode are readily available to the processor 100.

When the remote console C initiates a communications link with the remote management board 50, the processor is alerted to start sending video graphics data to the remote console C.

The process starts at a step 300 where the processor 100 reads one or more video graphics blocks 200 from the frame buffer 118a. Because the processor 100 and the video controller 114a are on a secondary PCI bus 102, the read cycles do not significantly impact the overall operational efficiency of the managed server S. The processor 100 converts the native color values into 6-bit color values and stores the video graphics block 200 in the 6-bit color pixel block 208 located in local RAM memory 108. At a step 302, the processor 100 hashes the 6-bit color pixel block 208 to generate a unique number or hashing code. The 16-bit hashing algorithm 204 is preferred since it runs faster than a 32-bit hashing algorithm, but a 32-bit hashing algorithm may be used to increase accuracy.

If processing the first screen of data (i.e. first pass), the process branches at step 304 to step 306 where the hash code is stored in the hash code table 202. Next, if processing the first pixel block 200 of a row that has changed, the process branches from step 308 to step 310 where the pixel block 200 is compressed using the compression algorithm 210, explained more fully with reference to FIG. 9. If not processing the first changed pixel block 200 of a row, the process branches from step 308 to step 311 where the process again branches to step 308 if the previously positioned block did not change. For example, if a block was skipped after one or more changed blocks. Otherwise, if the previously positioned block did change, the process branches to step 312 where the hash code corresponding to the current block is compared to the previous block. For example, if processing pixel block (0,1), the hash code of pixel block (0,1) is compared to the hash code of pixel block (0,0) stored in the hash code table 202.

If the hash codes are equal, processing branches from step 314 to step 316. If processing the first screen of data, the process branches at step 316 to step 318 where a second more detailed comparison is performed. This more detailed comparison is performed to assure that the pixel blocks are indeed equal. It is especially important on this first pass to assure that good data is transmitted. Alternatively, a more accurate hashing code, such as a 32-bit algorithm, could be utilized to avoid this second check. If the bytes of both pixel blocks match, then processing continues from step 320 to step 322 where the byte compression pipeline is flushed to move any previously accumulated "byte repeats" into the transmit buffer 212. At step 324, the repeated block count 216 is incremented to start a count of repeated blocks.

Referring back to step 314, if the hash codes are not equal, processing branches from step 314 to step 326 where the block compression pipeline is flushed to move any previously accumulated "block repeats" into the transmit buffer 212. Next, the new pixel block 200 is compressed using the compression algorithm 210.

Referring back to step 304, if not processing the first screen of data (i.e. first pass), the process branches from step 304 to step 328 where the hash code generated for the current block is compared to the hash code value stored in the hash code table 202 corresponding to the current block location. If the hash codes are not equal, the process branches from step 330 to step 306 (discussed above). If the hash codes are equal, the process branches from step 330 to step 332 where the block is skipped, meaning that the video graphics data has not changed for this pixel block 200. Next, the compression pipeline is flushed to move any previously accumulated "block repeats" into the transmit buffer 212 and to assure that the byte repeat counter is cleared.

Now referring to FIG. 7C, processing continues from steps 324, 310 or 334 to step 336 to check for an end of row condition. If not at the row end, processing branches from step 336 to step 338 where the process moves to the next block and continues at step 300. If at the row end, processing branches from step 336 to step 340 to flush the compression pipeline including the byte and block repeat counters. Next, processing continues at step 342 where the transmit buffer is developed into a transmit packet and transmitted to the remove console C via the modem 112*a* or NIC 110. Next, mouse and video configuration changes are identified. If no changes are detected, processing branches from step 346 to step 338. If changes are detected, processing branches from step 346 to step 348 to determine if a text mode has been entered. If so, processing terminates. If not so, processing branches from step 348 to step 350 where the mouse and/or video configuration changes are transmitted to the remote console C and processing returns to step 338 to process another row. Although the mouse and video configuration changes are transmitted in a separate packet from the data, it is understood that they could be transmitted in a combined packet.

Now turning to FIGS. 8A-C, there is illustrated three variations of flushing the compression pipeline. FIG. 8A illustrates a general flush routine. At a step 400, the process branches to step 402 if the block repeat count 216 is greater than zero. At step 402, a repeat block command is formed and written to the transmit buffer 212. Next at step 404, the repeat block count is cleared to '0' in preparation for the next repeated block.

If at step 400, the block repeat count 216 is zero the process branches to step 406. At step 406, the process branches to step 408 if the byte repeat count is greater than four. At step 408, a repeat byte command is formed based on the repeated byte in the repeated data buffer 220 and the repeat byte count 218. The repeat byte command is written to the transmit buffer 212. For example, if the repeated byte count is 5 for a data byte 0x45, the value 0x45ffe605h would be written to the transmit buffer 212 to communicate that a string of six bytes were compressed. If, at step 406, the byte repeat count is less than or equal to four the process branches to step 410 where the repeated byte in the repeated data buffer 220 is written to the transmit buffer 212 according to the count. If the count is zero nothing is written. Unless the byte count is greater than four, it is a more efficient use of resources to simply replicate the repeated byte the number of times indicated by the repeated byte count 218. For example, if the repeated byte count is three for the data byte 0x45, the value 0x45454545h would be written to the transmit buffer 212 to communicate the four bytes.

After steps 408 or 410, the repeated byte count is cleared to '0' in step 412 in preparation for the next repeated byte.

FIG. 8B illustrates a flush byte compression pipeline routine. At step 420, the process branches to step 422 if the byte repeat count is greater than four. At step 422, a repeat byte command is formed based on the repeated byte in the repeated data buffer 220 and the repeat byte count 218. The repeat byte command is written to the transmit buffer 212. If, at step 420, the byte repeat count is less than or equal to four the process branches to step 424 where the repeated byte in the repeated data buffer 220 is written to the transmit buffer 212 according to the count. If the count is zero nothing is written. After steps 422 or 424, the repeated byte count is cleared to '0' in step 426 in preparation for the next repeated byte.

FIG. 8C illustrated a flush block compression pipeline routine. At a step 430, the process branches terminates and returns to the calling routine if the block count is equal to zero. Otherwise, the process continues to step 432, where a repeat block command is formed and written to the transmit buffer 212. Next at step 434, the repeat block count is cleared.

Figure 9:
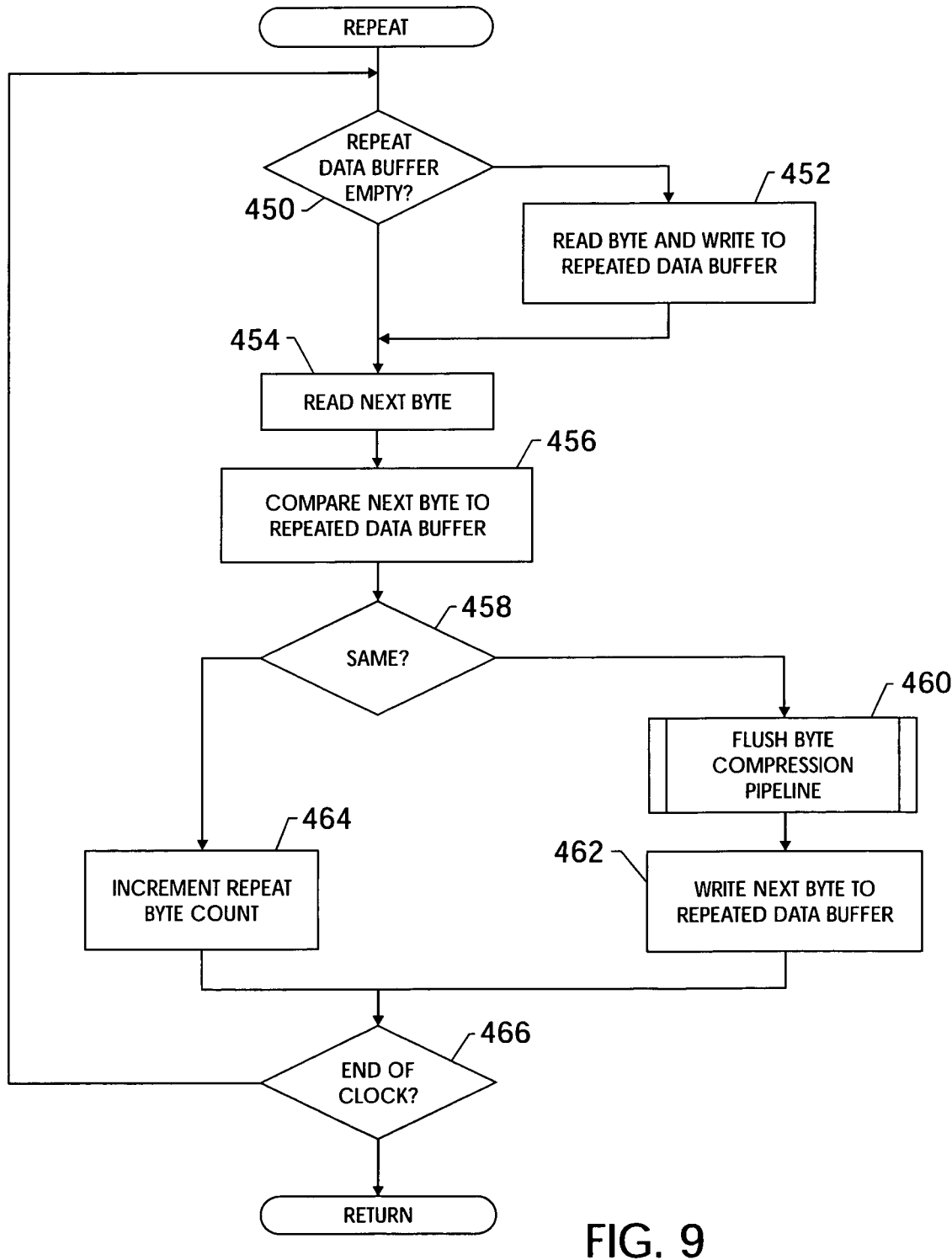
FIG. 9 is a flow diagram illustrating the block compression process according to the preferred embodiment.

Now turning to FIG. 9, there is illustrated the compress block routine called in step 310. At a step 450, if the repeated data buffer 220 is empty, the process branches to step 452 to read the first data byte and write it to the repeated data buffer 220. Otherwise, the process branches to step 454 to read the next data byte. Next, at step 456, the next data byte is compared to the data byte in the repeated data buffer 220. If the bytes are not equal, the process branches from step 458 to step 460 where the flush byte compression pipeline is called. After returning from the flush byte compression pipeline routine, at step 462 the next data byte (read at step 454) is written to the repeated data buffer 220.

If at step 458, the bytes are equal, the process branches from step 458 to step 464 where the repeat byte count 218 is incremented. From steps 462 and 464, the process loops back to step 450 if not at the end of the 6-bit color pixel block 208. If at the end of a block, the routine returns to the calling process.

Figure 10A:
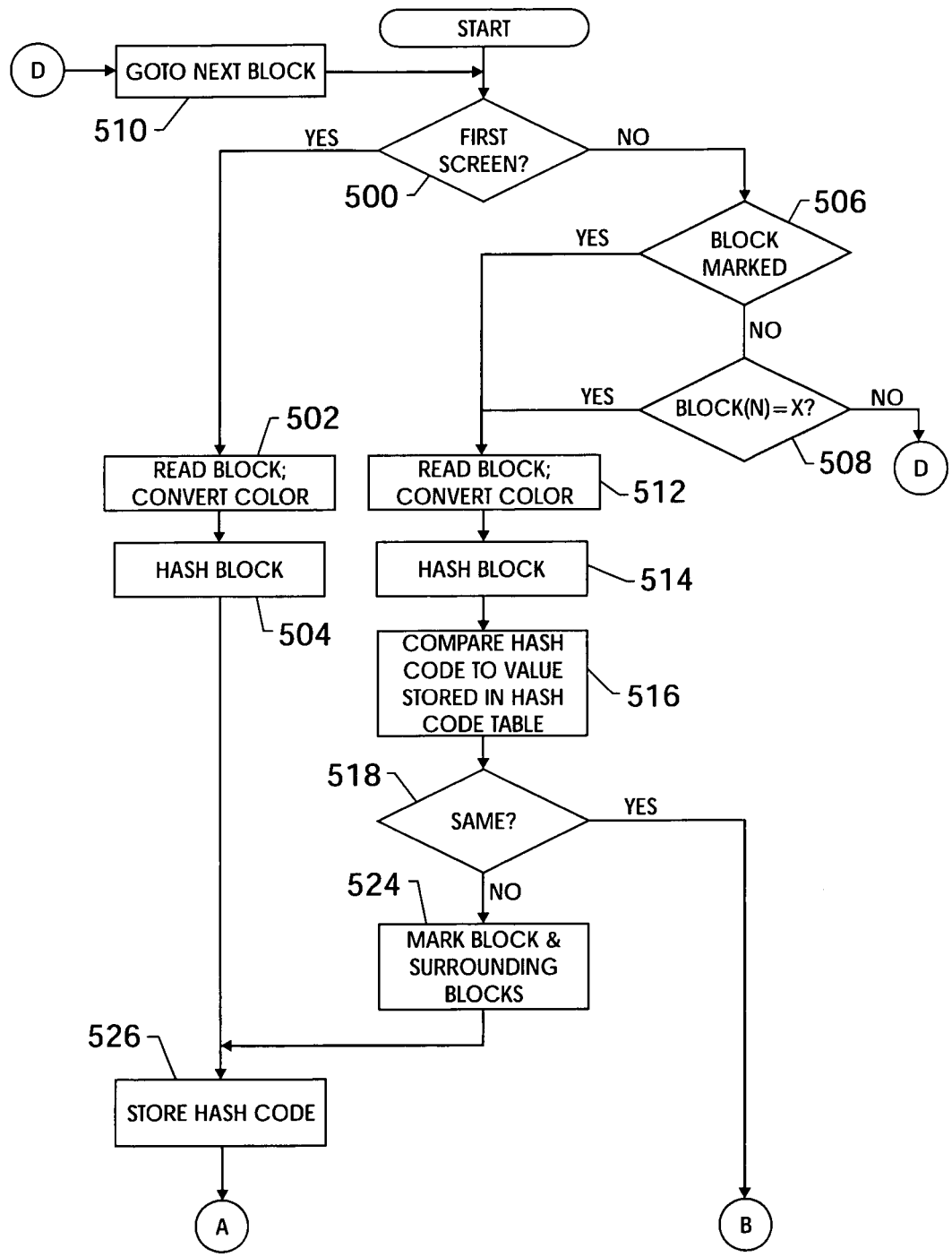
FIGS. 10A-C are flow diagrams illustrating the processes of FIGS. 5 and 6 according to the preferred embodiment.
Figure 10B:
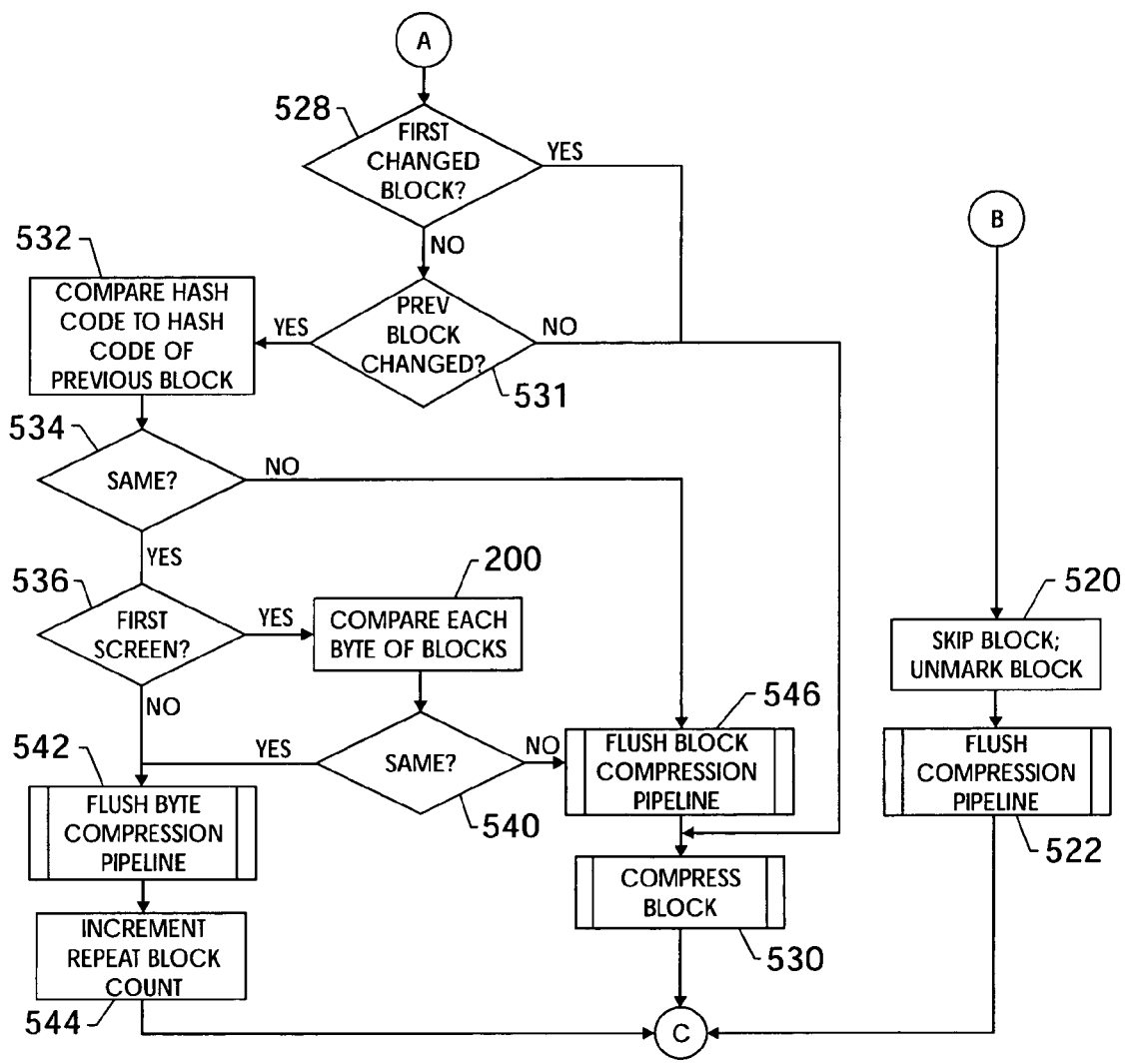
Figure 10C:
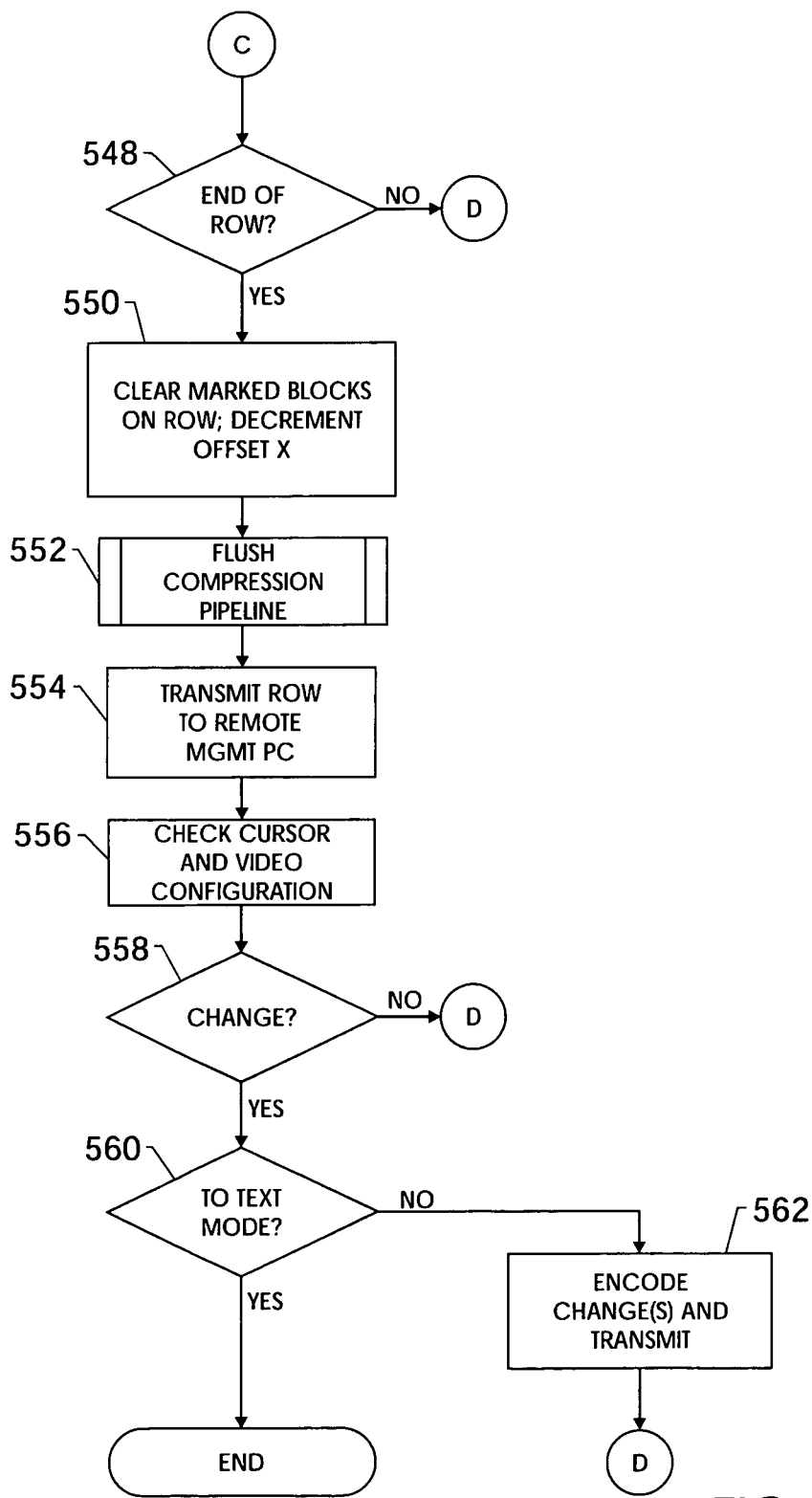
Figure 11A:
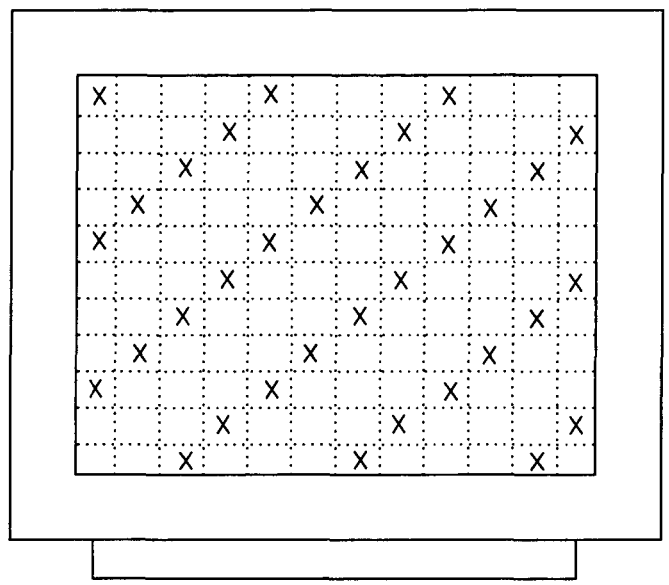
FIGS. 11A-B are block diagrams illustrating pixel block sampling and marking methods according to the preferred embodiment.

Referring now to FIGS. 10A-C, there is illustrated the methods related to reading, analyzing, compressing and transmitting video graphics data to the remote console C according to the preferred embodiment of the present invention. Generally, the process is similar that described in FIGS. 7A-B, except that instead of reading every pixel block 200 sequentially, the screen is sampled for changing data based on a pattern or count. For example, every second, third, fourth (as indicated by 'X'), etc., pixel block 200 can be read as illustrated in FIG. 11A. The sampling rotates every pass of the screen so that every pixel block 200 is eventually read. For example, if sampling every fourth pixel block, it would take four passes of the screen to read every pixel block of the screen.

Figure 11B:
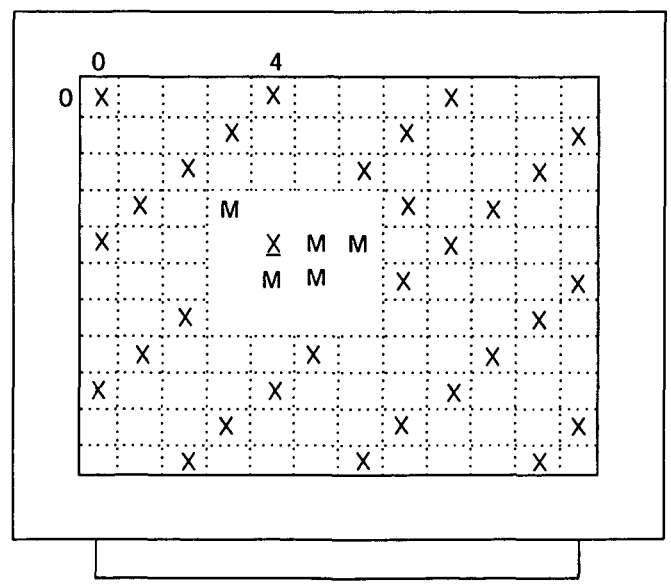

Once a changed pixel block 200 is located, the surrounding pixel blocks 200 may be marked for accelerated checking based on the likelihood that the surrounding pixel blocks 200 would also change. One example of marking surrounding pixels blocks is illustrated in FIG. 11B. A changed pixel block 200 was located at row 4, column 4. The surrounding pixel blocks are marked (as indicated by 'M') in a proximity table 222 so that they will be checked next rather than wait for the next sampling. This results in changed data being passed to the remote console C faster than the method described in FIGS. 7A-B. It is noted that the marked pixel block above and left of the current block will not be read until the next pass.

At a step 500, the process branches to step 502 if processing the first screen of data (i.e. first pass). At step 502, a pixel block 200 is read and converted to 6-bit color. Next, at step 504, the process hashes the 6-bit color pixel block 208 to generated a unique number or hashing code.

If not processing the first screen of data, the process branches at step 500 to step 506. At step 506, the process branches to step 508 if the pixel block 200 is not marked in the proximity table 222 for accelerated reading. At step 508, the process branches to step 510 to move to the next pixel block 200 if the pixel block 200 is not designated for reading on this pass.

Designating pixel blocks 200 for sampling can be accomplished with row and column modulo counters. For example, if every fourth block is to be sampled, on a first pass every '0' block will be read according to the column modulo-4 counter. On the second pass every '1' block will be read. A second modulo-4 counter can control the offset according to the row. FIG. 11A illustrates the resulting pattern. Other patterns can be designed according to the types of images that are displayed. For example, instead of reading rows from top to bottom, a diagonal or circular scheme could be developed.

Thus, if the pixel block 200 is not a surrounding "marked" block or a block designated for sampling, the process branches from step 508 to step 510 to move to the next block. Otherwise, the process branches to step 512 from steps 506 and 508 to read the pixel block 200 and convert to 6-bit color. Next, at step 514, the process hashes the 6-bit color pixel block 208 to generated a unique number or hashing code. When a block is hashed, its corresponding bit in the proximity table 222 is cleared. At step 516 the hash code generated for the current block is compared to the hash code value stored in the hash code table 202 corresponding to the current block location. If the hash codes are equal, the process branches from step 518 to step 520 where the block is skipped and the block is unmarked, meaning that the video graphics data has not changed for this pixel block 200. Next at step 522, the compression pipeline is flushed to move any previously accumulated "block repeats" into the transmit buffer 212 and assure that the repeated byte count is cleared.

If at step 518 the hash codes are not equal, the process branches from step 518 to step 524 to mark the current block and surrounding blocks as illustrated in FIG. 11B.

The process continues from steps 524 and 504 to step 526 where the calculated hash code is stored in the hash code table 202. Next, if processing the first pixel block 200 of a row that has changed, the process branches from step 528 to step 530 where the pixel block 200 is compressed using the compression algorithm 210, explained more fully with reference to FIG. 9. If not processing the first changed pixel block 200 of a row, the process branches from step 528 to step 531 where the process again branches to step 530 if the previously positioned block did not change. For example, if a block was skipped after one or more changed blocks were processed. Otherwise, if the previously positioned block did change, the process branches to step 532 where the hash code corresponding to the current block is compared to the previously positioned block. For example, if processing pixel block (0,1), the hash code of pixel block (0,1) is compared to the hash code of pixel block (0,0) stored in the hash code table 202.

If the hash codes are equal, processing branches from step 534 to step 536. If processing the first screen of data, the process branches at step 536 to step 538 where a second more detailed comparison is performed. This more detailed comparison is performed to assure that the pixel blocks are indeed equal. It is especially important on this first pass to assure that good data is transmitted. Alternatively, a more accurate hashing code, such as a 32-bit algorithm, could be utilized to avoid this second check. If the bytes of both pixel blocks match, then processing continues from step 540 to step 542 where the byte compression pipeline is flushed to move any previously accumulated "byte repeats" into the transmit buffer 212. At step 544, the repeated block count 216 is incremented to start a count of repeated blocks.

Referring back to step 534, if the hash codes are not equal, processing branches from step 534 to step 546 where the block compression pipeline is flushed to move any previously accumulated "block repeats" into the transmit buffer 212. Next, the new pixel block 200 is compressed using the compression algorithm 210.

Now referring to FIG. 10C, processing continues from steps 544, 530 or 522 to step 548 to check for an end of row condition. If not at the row end, processing branches from step 548 to step 510 where the process moves to the next block and continues at step 500. If at the row end, processing branches from step 548 to step 550 to clear the marked pixel blocks on the current row. Additionally, the second "column" modulo is decremented to offset the next row of sampled pixel blocks by one block as illustrated in FIG. 11A. Next, processing continues to step 552 where the repeated byte and block data is flushed into the transmit buffer 212. Next, processing continues at step 554 where the transmit buffer is developed into a transmit packet and transmitted to the remove console C via the modem 112a or NIC 110. Next, mouse and video configuration changes are identified. If no changes are detected, processing branches from step 558 to step 548. If changes are detected, processing branches from step 558 to step 560 to determine if a text mode has been entered. If so, processing terminates. If not so, processing branches from step 560 to step 562 where the mouse and/or video configuration changes are transmitted to the remote console C.

Thus, there has been described and illustrated herein, a method and apparatus for reading, analyzing, compressing and transmitting video graphics data to a remote console C. However, those skilled in the art should recognize that many modifications and variations in the size, shape, materials, components, circuit elements, wiring connections and contacts besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A method for transmitting video graphics data, comprising:
a processor dividing a screen into a number of blocks, the blocks having contents;
the processor periodically reading, from a buffer, the contents of each one of the blocks over a number of passes, wherein each pass reads a different set of blocks, each block within the set being read in its entirety, the set comprising a fraction of all the blocks;
the processor computing a unique value for a first block based on the contents;
the processor comparing the unique value for the first block to a previously computed unique value corresponding to the first block; and
the processor transmitting the contents of the first block if the unique value for the first block is different from the previously computed unique value corresponding to the first block.

2. The method of claim 1, further comprising:
storing the unique value for the first block in a table if the unique values are different; and
comparing the unique value of the first block to a unique value corresponding to a preceding block,
wherein the transmitting step transmits the preceding block and a repeat command if the unique value of the first block is equal to the unique value corresponding to the preceding block.

3. The method of claim 1, further comprising:
storing the unique value of the first block in a table if the unique values are different;
comparing the unique value of the first block to a unique value corresponding to a preceding block; and
compressing the contents of the first block if the unique values are not equal,
wherein the transmitting step transmits the preceding block and a compressed first block if the unique value of the first block is not equal to the unique value corresponding to the preceding block.

4. The method of claim 3, wherein the compressing step includes compressing a number of similar bytes using a run length encoding technique.

5. The method of claim 1, further comprising:
periodically reading configuration information of a video graphics controller;
determining if the configuration information has changed; and
transmitting configuration changes if the configuration information has changed.

6. The method of claim 5,
wherein the screen is divided into a number of blocks, including rows and columns, based on the screen resolution, and
wherein the configuration information is read after a row of blocks is completed.

7. The method of claim 1, further comprising:
periodically reading information of a pointing device;
determining if a position of the pointing device has changed; and
transmitting configuration changes if the position has changed.

8. The method of claim 7,
wherein the screen is divided into a number of blocks, including rows and columns, based on the screen resolution, and
wherein the configuration information is read after a row of blocks is completed.

9. The method of claim 1, wherein surrounding blocks are marked for accelerated processing if during one of the passes the unique value for a given block is different from a previously computed unique value corresponding to the given block.

10. The method of claim 9, wherein each pass reads a different set of blocks and any blocks marked for accelerated processing.

11. The method of claim 1, wherein the blocks contain color values, the method further comprising:
condensing the color values into 6-bit red-green-blue color values before computing the unique values.

12. The method of claim 11, wherein the blocks contain color values, the method further comprising:
condensing the color values into 6-bit red-green-blue color values, before computing the unique values.

13. A method of transmitting video graphics data, comprising:
a processor dividing a screen into a number of blocks;
the processor reading, from a buffer, a first block and at least one subsequent block wherein all the blocks are read over a number of passes and wherein each pass reads a different set of blocks, each block within the set being read in its entirety, the set comprising a fraction of all the blocks;
the processor comparing the first block to a subsequent block;
the processor developing a repeat command based on how many subsequent blocks equal the first block; and
the processor transmitting the first block and the repeat command.

14. The method of claim 13, comprising:
periodically reading configuration information of a video graphics controller;
determining if the configuration information has changed; and
transmitting configuration changes if the configuration information has changed.

15. The method of claim 14,
wherein the screen is divided into a number of blocks, including rows and columns, based on the screen resolution, and
wherein the configuration information is read after a row of blocks is completed.

16. The method of claim 13, comprising:
periodically reading configuration information of a pointing device;
determining if a position of the pointing device has changed; and
transmitting configuration changes if the position has changed.

17. The method of claim 16,
wherein the screen is divided into a number of blocks, including rows and columns, based on the screen resolution, and wherein the configuration information is read after a row of blocks is completed.

18. The method of claim 13, wherein surrounding blocks are marked for accelerated processing if during one of the passes the unique value for a given block is different from a previously computed unique value corresponding to the given block.

19. The method of claim 18, wherein each pass reads a different set of blocks and any blocks marked for accelerated processing.

20. A method of transmitting video graphics data, comprising;
 a processor dividing a screen into a number of blocks;
 the processor reading, from a buffer, a first block of the screen;
 the processor compressing the first block;
 the processor reading, from a buffer, a second block of the screen, wherein all the blocks are read over a number of passes and each pass reads a different set of blocks, each block within the set being read in its entirety, the set comprising a fraction of all the blocks;
 the processor comparing the first block to the second block;
 the processor compressing the second block with the first block if the first and second blocks are not equal; and
 the processor transmitting the compressed blocks.

21. The method of claim 20, wherein the compressing step includes compressing a number of similar bytes using a run length encoding technique.

22. The method of claim 20,
 wherein surrounding blocks are marked for accelerated processing if during one of the passes the unique value for a given block is different from a previously computed unique value corresponding to the given block, and
 wherein the reading step includes reading a different fraction of all the blocks and any blocks marked for accelerated processing.

23. A computer system for communicating with a remote console, comprising:
 a video graphics controller having a frame buffer;
 a communication device; and
 a processor coupled to the video graphics controller and the communications device, the processor configured to:
  divide the frame buffer into a number of blocks;
  periodically read the frame buffer and determine whether any of the blocks have changed since a previous reading, wherein the processor reads all of the blocks over a number of passes and wherein each pass reads a different set of blocks, each block within the set being read in its entirety, the set comprising a fraction of all the blocks; and
  transmit changed blocks to the remote console via the communications device.

24. The computer system of claim 23, wherein a hash code is calculated and stored for each block when the block is first read, and wherein subsequent changes are determined for a given block by calculating a new hash code and comparing the new hash code to the stored hash code.

25. The computer system of claim 24, wherein if subsequently positioned changed blocks have hash codes equal to a previously positioned block, the processor is configured to develop a repeat command to indicate how many times the previously positioned block is repeated prior to transmission.

26. The computer system of claim 24, wherein if subsequently positioned changed blocks have hash codes unequal to a previously positioned block, the processor is configured to compress the subsequently positioned changed block prior to transmission.

27. The computer system of claim 26, wherein the processor is configured to compress similar bytes within a block using a run length encoding technique.

28. The computer system of claim 23, wherein the processor is further configured to:
 periodically read configuration information of the video graphics controller;
 determine if the configuration information has changed; and
 transmit configuration changes if the configuration information has changed.

29. The computer system of claim 28,
 wherein the screen is divided into a number of blocks, including rows and columns, based on the screen resolution, and
 wherein the processor reads the configuration information after a row of blocks is completed.

30. The computer system of claim 23, wherein the processor is further configured to:
 periodically read configuration information of a pointing device;
 determine if a position of the pointing device has changed; and
 transmit configuration changes if the position has changed.

31. The computer system of claim 30,
 wherein the screen is divided into a number of blocks, including rows and columns, based on the screen resolution, and
 wherein the processor reads the configuration information after a row of blocks is completed.

32. The computer system of claim 23, wherein the processor marks surrounding blocks for accelerated processing if during one of the passes the unique value for a given block is different from a previously computed unique value corresponding to the given block.

33. The computer system of claim 32, wherein each pass reads a different set of blocks and any blocks marked for accelerated processing.

34. A computer system for communicating with a remote console, comprising:
 a video graphics controller having a frame buffer;
 a monitor connectable to the video graphics controller;
 a communication device; and
 a processor coupled to the video graphics controller and the communications device, the processor configured to:
  divide the frame buffer into a number of blocks;
  periodically read the frame buffer and determine whether any of the blocks have changed since a previous reading, wherein each of the blocks are read over a number of passes and wherein each pass reads a different set of blocks, each block within the set being read in its entirety, the set comprising a fraction of all the blocks; and
  transmit changed blocks to the remote console via the communications device.

35. An apparatus for updating video graphics data for a remote console, comprising:
 means for dividing a frame buffer into a series of blocks;
 means for reading one of the blocks, wherein each of the blocks are read over a number of passes and wherein each pass reads a different set of blocks, each block within the set being read in its entirety, the set comprising a fraction of all the blocks;
 means for computing a hash code for the block;
 means for comparing the hash code to a previously computed hash code for the block; and
 means for transmitting the block if the hash codes are not equal.

* * * * *

UNITED STATES PATENT AND TRADEMARK OFFICE
CERTIFICATE OF CORRECTION

Page 1 of 1

PATENT NO.        : 8,610,734 B2
APPLICATION NO.   : 10/611403
DATED             : December 17, 2013
INVENTOR(S)       : Theodore F. Emerson et al.

It is certified that error appears in the above-identified patent and that said Letters Patent is hereby corrected as shown below:

In the Claims

In column 16, line 17, in Claim 12, delete "values," and insert -- values --, therefor.

Signed and Sealed this
Twenty-third Day of September, 2014

Michelle K. Lee
*Deputy Director of the United States Patent and Trademark Office*